United States Patent Office 3,249,257
Patented May 3, 1966

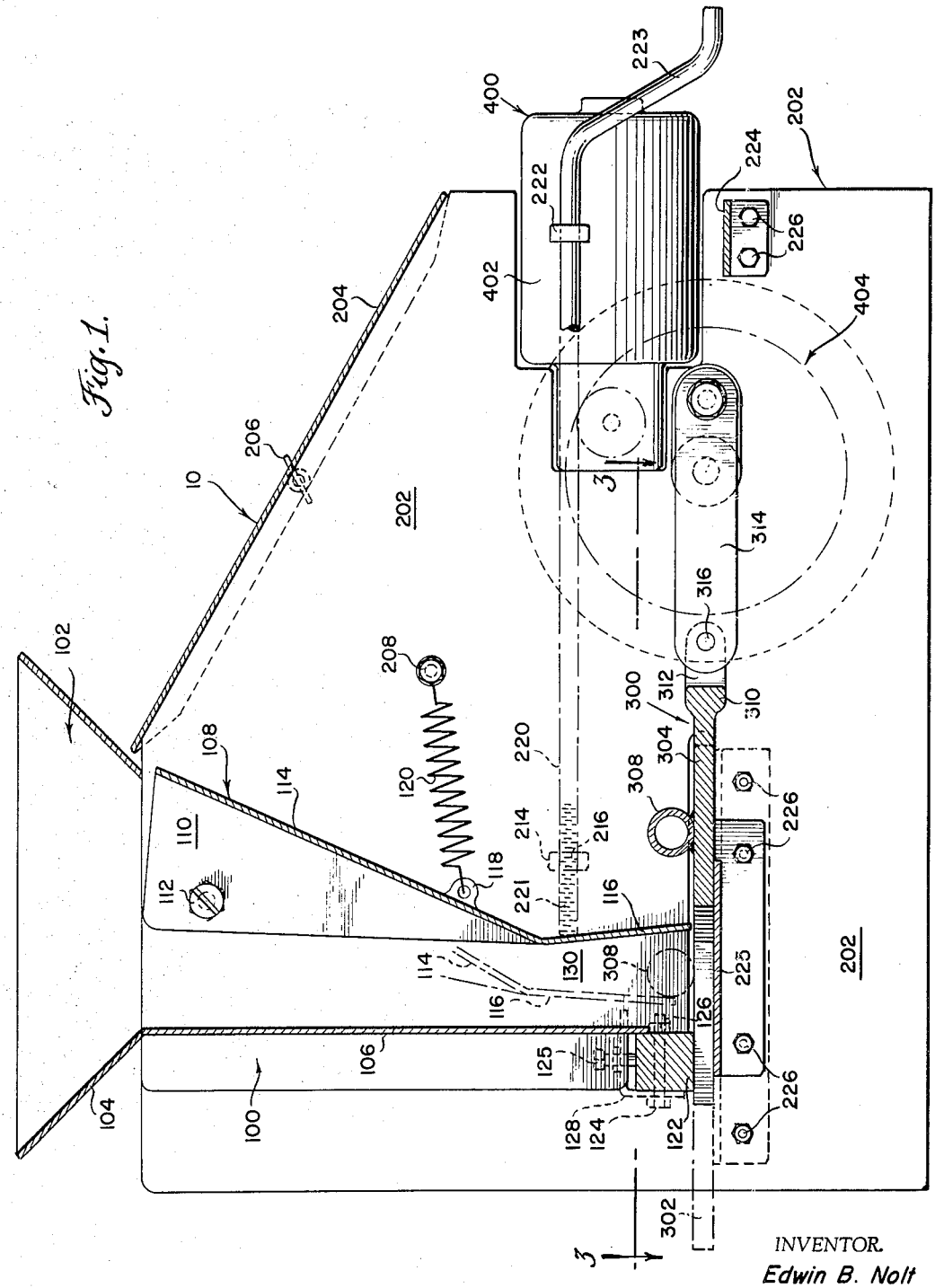

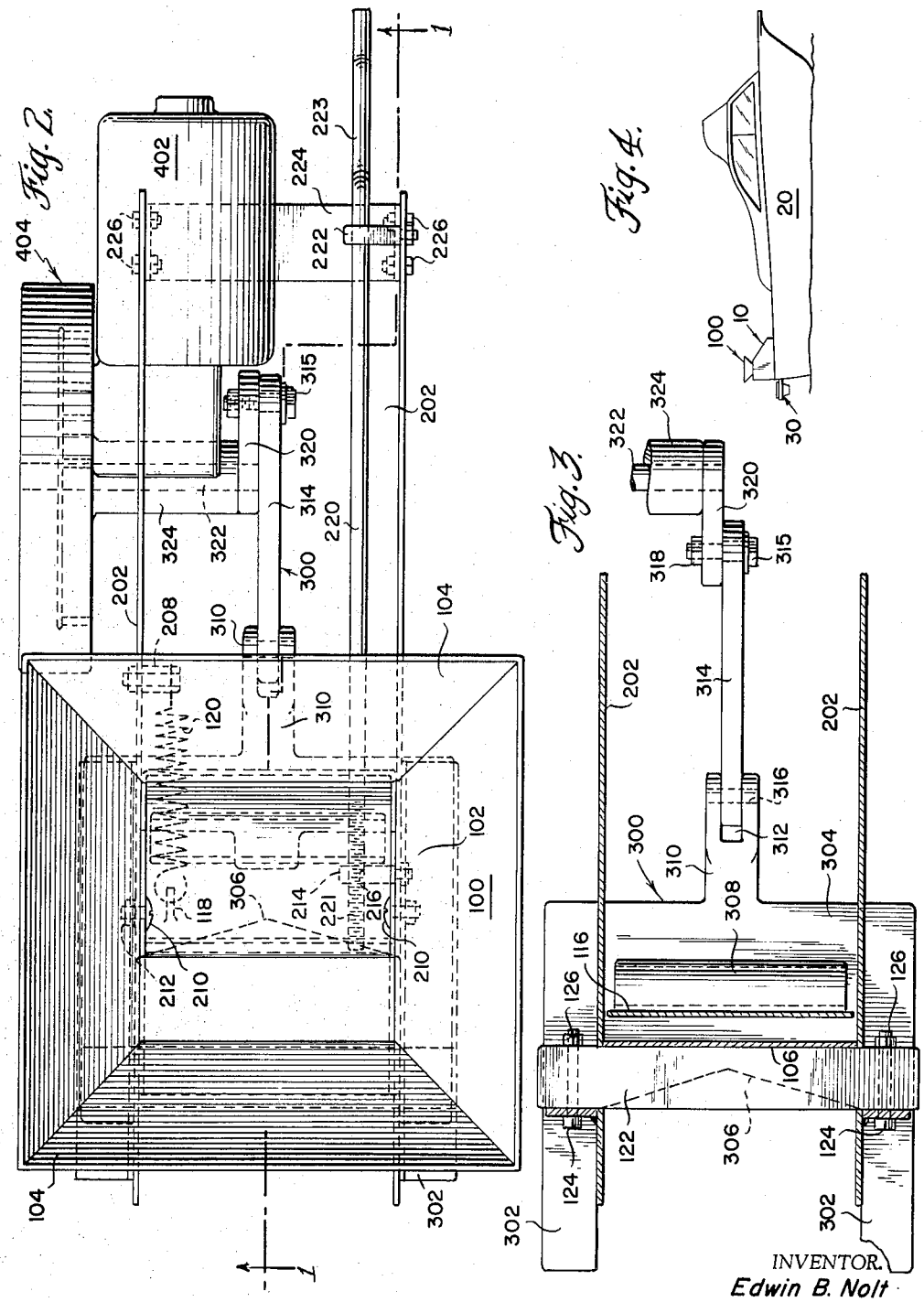

3,249,257
BAIT CHUMMER
Edwin B. Nolt, New Holland, Pa., assignor to Sperry Rand Corporation, New Holland, Pa., a corporation of Delaware
Filed Oct. 12, 1964, Ser. No. 403,060
4 Claims. (Cl. 222—80)

This invention relates to a device for periodically dispensing material, more particularly to a bait chummer.

One of the means of attracting fish, particularly the large varieties when fishing from a boat, is to throw pieces of chopped bait overboard to attract the fish to the vicinity of the boat. In chopping up the bait or fish to be thrown overboard the deck and remainder of the boat becomes quite messy and leaves a lingering odor. This is particularly true when the bait must be cut up by hand and physically thrown overboard.

It is a purpose of this invention to provide a device wherein the bait may be chopped and thrown overboard without the need for cutting and throwing the fish by hand.

It is another object to provide a bait chummer where the material or bait to be dispensed is agitated toward the outlet opening.

A further object is to provide a slow speed bait chummer where bait or the like will be mechanically dispensed at regular intervals usually only a very few times per minute.

It is a further object to provide a bait chummer having a reciprocating piston at the outlet of the material holder for pushing the material transverse to the outlet.

Still another object is to provide a chummer having walls forming a chute, one wall being movable with, and actuated by, a reciprocating knife or piston pushing material out transverse to the outlet of the chute.

A further object is to provide a bait chummer for use on a boat wherein a uniform, measured amount is dispensed into the water at selected intervals.

Another object is to provide a simple and economic means for periodically dispensing bait or the like.

According to the present invention, the foregoing and other objects are attained by providing a chute having one of its walls movable, a reciprocating means cooperating with the outlet for pushing material transverse to the outlet. There is also provided means for agitating the movable wall in conjunction with the reciprocation of the piston.

Other objects and advantages of the invention will become apparent from the following detailed description taken in conjunction with the accompanying drawings, in which FIGURE 1 is a longitudinal section taken on the line 1—1 of FIGURE 2, FIGURE 2 is a plan view of FIGURE 1 with the slanting lid removed.

FIGURE 3 is a plan section taken on the line 3—3 of FIGURE 1 with the blade in its rearward stroke position, and FIGURE 4 is a side view of the entire device mounted on the back of a ship.

Referring now to the drawings wherein like reference numerals designate identical or corresponding parts throughout the several views, and more particularly to FIGURES 1 and 4 wherein a bait chummer 10 is mounted on the rear of a boat 20. Chopped bait from chummer 10 is deposited into a chute 30 which in turn directs the material into the water.

The chummer 10 comprises a chute 100 mounted on a support 200. As will be described more fully hereinafter bait is pushed out of the chummer 10 into chute 30 by means of a reciprocating member 300 which is operated by a power conversion means 400.

The chute 100 has an inlet opening 102 formed by funnel shaped walls 104. The remainder of the chute is formed by a front wall 106, support walls 202 (described below) and pivoted wall 108.

The pivoted wall 108 is formed by two side portions 110 pivoted at 112 and a funnel forming connecting section 114. The lower portion of member 108 extends downwardly at 116. Lower portion 116, in its rearward position, extends slightly rearward from a vertical line drawn at the point where 114 joins 116, thus forming an obtuse angle between the two members. It will allow a greater amount of material to be situated in the area of the outlet. This particular configuration will prevent the bait from being pushed upward and allow for a greater concentration as the wall is moved to its forward position shown in dash lines in FIGURE 1.

The angularly shaped connecting section 114 has attached thereto an apertured projection 118 to which a biasing means such as spring 120 is attached.

Attached to the front wall 106 is a block 122. This block is secured to the chute by means of fasteners comprising bolts 124, and 125 and nuts 126 secured to a right angle attaching bracket 128. Block 122 is adjustably movable by means of screws 125 and adjacent an outlet opening 130.

As will be discussed below the pivoted wall 108 is shown in FIGURE 1 in dash lines in its forward position and in solid lines in its rearward position.

The support structure 200 as best seen in FIGURE 1 comprises a pair of support walls 202 and a removably mounted slanting lid 204. Wing nut 206 is used for removably securing the lid to support walls 202. Spring 120 has one end fixedly secured to the support wall at 208.

As seen in dash lines in FIGURE 2, the front chute wall 106 is attached to the support walls by means of screws 210 and nuts 212. Also secured to one of the support walls is a projection 214 having a threaded aperture 216 to receive an adjustable abutment 220. This abutment is threaded at 221 to cooperate with the threaded aperture 216 in projection 214. This adjustable abutment provides a rearward limiting position for the movable wall 108 as best seen in FIGURE 1. There is a similar abutment bracket 222 stabilizing the rearward end of the adjustment abutment. The abutment 220 is adjusted by rotating handle 223 on the rear end thereof.

The two walls 202 are stabilized by means of a mounting bracket 224 and 225 which is secured to the walls by nut and bolts 226. Bracket 225 also serves as a support for reciprocating rod 300.

Located below the outlet or discharge end 130 of chute 100 is a reciprocating piston and rod assembly 300 which is used to push material transverse to the outlet opening. This reciprocating member or piston 300 is generally U-shaped having legs 302 and a bight portion 304. The inner portion of the U-shaped configuration is shown tapering to a point at 306. Mounted on the bight is a wall engaging means in the form of a rod 308 which is situated on the upper surface of 304 at a sufficient height to engage the depending portion 116 of the movable or pivoted wall.

Extending rearwardly of the bight member is an extension 310 which has a U-shaped opening 312 to receive linkage 314. Members 310 and 314 are joined by means of a pin 316.

The rearward portion of linkage 314 is apertured to receive a bolt 315 which cooperates with a nut 318 to connect an apertured crank arm 320 thereto. The crank arm 320 is connected as by keying, to rotating shaft 322 and a rotating sleeve 324.

Mounted in one support wall 202 is a power conversion source 400 which comprises a motor 402 which connects to a conventional gear reduction system 404. In the instant device this gear reduction mechanism is shown as being of the interval gear type. This gearing system is connected to the rotating rod and sleeve in a conventional manner. A similar system is shown in Howe Patent No. 2,562,614, issued July 31, 1951.

Operation

In operation the bait chumming unit 10 having a first chute 106 is mounted on the back end of a boat 20. The discharge outlet 130 is located adjacent a second chute 30 which is also mounted on the boat and over the water.

Bait, such as fish or other material, to be dispensed into the water is put into the inlet opening 102. Motor 402 is energized which starts the gearing mechanism 404 in operation. A gearing system that will produce the desired periodic discharge is selected. It has been found that by having somewhere between 4 to 8 revolutions of shaft 322 and crank arm 320 per minute provides a desirable discharge rate.

Shaft 322 and sleeve 324 rotate crank arm 320 at selected intervals, thus forming a reciprocating movement in linkage 314 and the pusher mechanism 300 generally. As the reciprocating piston 300 moves forward and backward the pivoted wall engaging means 308 engages depending portion 116 of the movable wall. The adjustable abutment 220 limits the rearward movement of the wall as biasing means 120 pulls the wall to its rearward position. Bight portion 304 in conjunction with the tapered inner surface 306 provides a knife like shearing action with the depending portion of the wall and the block 122 to shear off a uniform amount of bait and push the material transverse to the outlet opening 130 and into the second chute 30 and hence into the water. The rearward position is shown in solid lines in FIGURE 1 and in dashed lines in the same figure. FIGURE 2 discloses a plan view of the reciprocating rod in its rearward position, while FIGURE 3, also a plan view, shows the piston in its forward position with the wall engaging means 308 forcing the depending portion of the movable wall 116 to a position adjacent front wall 106. This agitation of the movable wall will provide a crusher action on the material thus compacting it and facilitating the shearing of a uniform portion, and also the pivoting wall will serve to agitate the material to help force it to the outlet opening.

It will be seen that the device will provide a uniform discharge at a selected interval of time. The fishermen thus can devote their full attention to their lines and need not worry about chopping bait and throwing it over the side at selected intervals.

When it is desired to vary the rearward location of the movable wall 108, the adjustable abutment 220 is merely cranked by the use of handle 228. Slanting lid 204 may be removed by utilizing wing nut 206 to facilitate access to the interior of the mechanism. By turning adjustment screw 124 the cooperating cutting block 122 may be moved into and out of engagement with the shearing knife of the reciprocating piston 300.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described my invention what I claim is:
1. A bait chummer device comprising:
   (a) a chute having walls forming an inlet and an outlet, one of said walls being movable,
   (b) a reciprocating piston adjacent said outlet for pushing material transverse to said outlet, said reciprocating piston cooperating with an adjustable means on one of said walls thereby providing a shearing action between said piston and said adjustable means,
   (c) means on said piston for engaging said movable wall during reciprocation to oscillate said movable wall thereby agitating the material in said chute.
2. A bait chummer for use on a boat comprising:
   (a) a chute having walls forming an inlet and an outlet, one of said walls being movable, said movable wall moving forward toward and rearward away from a stationary wall and including an upper portion and a lower portion, said upper portion cooperating with the remainder of said walls to form a funnel shaped chute, and said lower portion forming an obtuse angle with said upper portion whereby in its rearward position the distance at the outlet opening between said movable wall and said stationary wall being larger than at the juncture of said upper and lower portions,
   (b) means cooperating with said outlet for pushing material transverse to said outlet,
   (c) means on the upper surface of said pushing means engaging the lower edge of said lower portion thereby agitating the material in said chute.
3. A bait chummer device as defined in claim 2 which further includes means to bias said movable wall toward the rearward position of said piston.
4. A bait chummer device as defined in claim 3 which further includes means to limit the rearward movement of said wall.

References Cited by the Examiner

UNITED STATES PATENTS

| | | | |
|---|---|---|---|
| 1,607,014 | 11/1926 | Moak | 221—204 |
| 2,108,376 | 2/1938 | Copeland | 221—205 |
| 2,380,533 | 7/1945 | Lebrecht | 221—205 |
| 2,420,812 | 5/1947 | Brunner | 221—205 |
| 2,539,780 | 1/1951 | Hall | 222—243 |
| 2,562,614 | 7/1951 | Howe | 222—245 |
| 2,675,947 | 4/1954 | Wynn | 222—80 X |
| 2,801,729 | 8/1957 | Hejtmanek | 221—205 |

FOREIGN PATENTS 1,139,221  6/1957  France.

RAPHAEL M. LUPO, *Primary Examiner.*

W. SOBINI, *Assistant Examiner.*